US011216927B2

(12) United States Patent
Peng et al.

(10) Patent No.: US 11,216,927 B2
(45) Date of Patent: Jan. 4, 2022

(54) VISUAL LOCALIZATION IN IMAGES USING WEAKLY SUPERVISED NEURAL NETWORK

(71) Applicant: Siemens Aktiengesellschaft, Munich (DE)

(72) Inventors: Kuan-Chuan Peng, Plainsboro, NJ (US); Ziyan Wu, Princeton, NJ (US); Jan Ernst, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 16/495,256

(22) PCT Filed: Mar. 16, 2018

(86) PCT No.: PCT/US2018/022871
§ 371 (c)(1),
(2) Date: Sep. 18, 2019

(87) PCT Pub. No.: WO2018/170401
PCT Pub. Date: Sep. 20, 2018

(65) Prior Publication Data
US 2020/0226735 A1 Jul. 16, 2020

Related U.S. Application Data

(60) Provisional application No. 62/472,045, filed on Mar. 16, 2017.

(51) Int. Cl.
*G06T 7/00* (2017.01)
*G06K 9/62* (2006.01)
(Continued)

(52) U.S. Cl.
CPC ............ *G06T 7/0002* (2013.01); *G06K 9/623* (2013.01); *G06K 9/628* (2013.01); *G06K 9/6262* (2013.01);
(Continued)

(58) Field of Classification Search
CPC .................... G06T 7/0002; G06T 3/40; G06T 2207/20084; G06T 2207/20216;
(Continued)

(56) References Cited

U.S. PATENT DOCUMENTS 10,742,399 B2 * 8/2020 Chen ................. G06K 9/00624
2021/0019572 A1 * 1/2021 Munoz Delgado .... G06N 7/005

OTHER PUBLICATIONS

Amir Rosenfeld and Shimon Ullman. "Visual Concept Recognition and Localization via Iterative Introspection". ACCV, May 2016; Department of Computer Science and Applied Mathematics, Weizmann Institute of Science, Rehovot, Israel.
O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet Large Scale Visual Recognition Challenge. International Journal of Computer Vision, 115(3):211-252, 12 2015.
(Continued)

*Primary Examiner* — Charles T Shedrick

(57) ABSTRACT

A system and method for visual anomaly localization in a test image includes generating, in plurality of scaled iterations, attention maps for a test image using a trained classifier network, using image-level. A current attention map is generated using an inversion of the classifier network on a condition that a forward pass of the test image in the classifier network detects a first class. One or more attention regions of the current attention map may be extracted and resized as a sub-image. For each scaled iteration, extraction of one or more regions of a current attention map is performed on a condition that the current attention map is significantly different than the preceding attention map. Visual localization of a region for the class in the test image is based on one or more of the attention maps.

14 Claims, 6 Drawing Sheets

(51) Int. Cl.
*G06N 3/08* (2006.01)
*G06T 3/40* (2006.01)

(52) U.S. Cl.
CPC .............. *G06K 9/6288* (2013.01); *G06N 3/08* (2013.01); *G06T 3/40* (2013.01); *G06T 2207/20084* (2013.01); *G06T 2207/20216* (2013.01)

(58) Field of Classification Search
CPC ...... G06K 9/623; G06K 9/6262; G06K 9/628; G06K 9/6288; G06K 9/6284; G06K 9/3233; G06N 3/08; G06N 3/0454; G06N 3/084
See application file for complete search history.

(56) References Cited

OTHER PUBLICATIONS

Szegedy, Christian et al. "Going deeper with convolutions." 2015 IEEE Conference on Computer Vision and Pattern Recognition (CVPR) (2015): 1-9.
International Search Report dated Jun. 13, 2018; International Application No. PCT/US2018/022871; Filing Date: Mar. 16, 2018; 13 pages.
Zhang Jianming et al: "Top-Down Neural Attention by Excitation Backprop", Sep. 17, 2016.
Karen Simonyan et al: "Deep Inside Convolutional Networks: Visualising Image Classification Models and Saliency Maps", Dec. 20, 2013, XP055226059.
Simon Marcel et al: "Part Detector Discovery in Deep Convolutional Neural Networks", Nov. 14, 2014.

\* cited by examiner

VISUAL LOCALIZATION IN IMAGES USING WEAKLY SUPERVISED NEURAL NETWORK

This application is a national phase filing under 35 U.S.C. § 371 of International Patent Application No. PCT/US2018/022871, filed Mar. 16, 2018, which claims the benefit of priority to U.S. Provisional Patent Application Ser. No. 62/472,045, filed Mar. 16, 2017, which are incorporated herein by reference in their entirety.

TECHNICAL FIELD

This application relates to artificial intelligence. More particularly, this application relates to applying artificial intelligence to a visual recognition system.

BACKGROUND

Visual recognition systems may apply machine learning based methods, such as a convolutional neural network, which can involve training the system to recognize features or objects of interest in an image according to learned classifications. Classifications may include tangible properties, such as identifying presence of a particular animate or inanimate thing. For instance, the system may be trained to learn one or more classifications (e.g., flower, dog, chair), and once trained, analyze a series of test images to identify which images include an object of the trained classification.

Visual localization with machine learning assistance can be applied to detecting an anomaly within an image or identifying abnormal object(s) potentially causing an anomaly. Such applications are important for both the safety of employees and quality control in the industrial production process. Conventional approaches of anomaly detection require visual inspection by personnel, either by physical inspection or by viewing images from camera feeds.

Current methods of machine learning based visual localization have practical limitations including requiring intensive manual pixel-wise or bounding box labeling of training images. For example, the labeling may involve drawing bounding boxes around the abnormal objects appearing in the image, which is time-consuming and not scalable.

SUMMARY

Aspects according to embodiments of the present disclosure include a system for visual localization in a test image, which includes at least one storage device storing computer-executable instructions and at least one processor configured to access the at least one storage device and execute the instructions to generate, in plurality of scaled iterations, attention maps for a test image using a trained classifier network, wherein the classifier network is weakly supervised using image-level classifications. On a condition that a forward pass of the test image in the classifier network detects a first class, a current attention map is generated using an inversion of the classifier network. The executed instructions may further extract, in each scaled iteration, one or more regions of the current attention map having attention values greater than a threshold, and may resize each of the one or more extracted regions as a sub-image, wherein size of the sub-image is an incremental enlargement than the extracted region. Each subsequent attention map of respective scaled iterations may be based on an inversion of the classifier network for each sub-image on a condition that a forward pass of the sub-image in the classifier network detects the first class. For each scaled iteration, extraction of one or more regions of a current attention map may be performed on a condition that the current attention map is significantly different than the preceding attention map. The executed instructions may further identify a visual localization of the first class for the test image based on one or more of the subsequent attention maps.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Aspects of embodiments of this disclosure include a method which uses a weakly supervised network to detect localization regions in an image of one or more objects. A classifier network, such as a Convolutional Neural Network (CNN), may be trained for classification of an image as including a classified object, or as having characteristics of a conceptual class. A captured image may be processed by the classifier network to classify the content of the image according to one or more classes. For example, the classification may apply to identifying any presence of an anomaly in the image with respect to a trained normal condition. The anomalies may correspond to defects in the object depicted in the image, or to abnormalities detected within a normal setting. Without prior knowledge of what shape or form the anomalies in an image take, a gradient-based inversion, or back propagation, of the classifier network may be applied to discover the intrinsic properties of normal and abnormal parts of the image. For example, an attention map may be generated in the form of a grayscale representation of the input image, where attention to a suspected anomaly is highlighted. To refine the anomaly detection and filter out false detections, each high response attention region (e.g., the brightest regions of the attention map) may be cropped as a patch or sub-image for further processing at an incremented scale. Each sub-image may be scaled to a standard image size and processed by a forward pass of the classifier as in the first pass of the input image. If an abnormal classification is detected, the inversion of the classifier may be executed to generate an attention map. Further iterations at incremented scales of attention regions may be repeated until the difference between consecutive attention maps is less than a threshold, or until a maximum number of iterations have occurred. A compilation of attention maps may be produced, such as by averaging pixel magnitudes for all attention maps, which has the effect of diminishing grayscale intensity of regions without an anomaly and intensifying grayscale values in regions having indication of anomaly detection.

Figure 1:
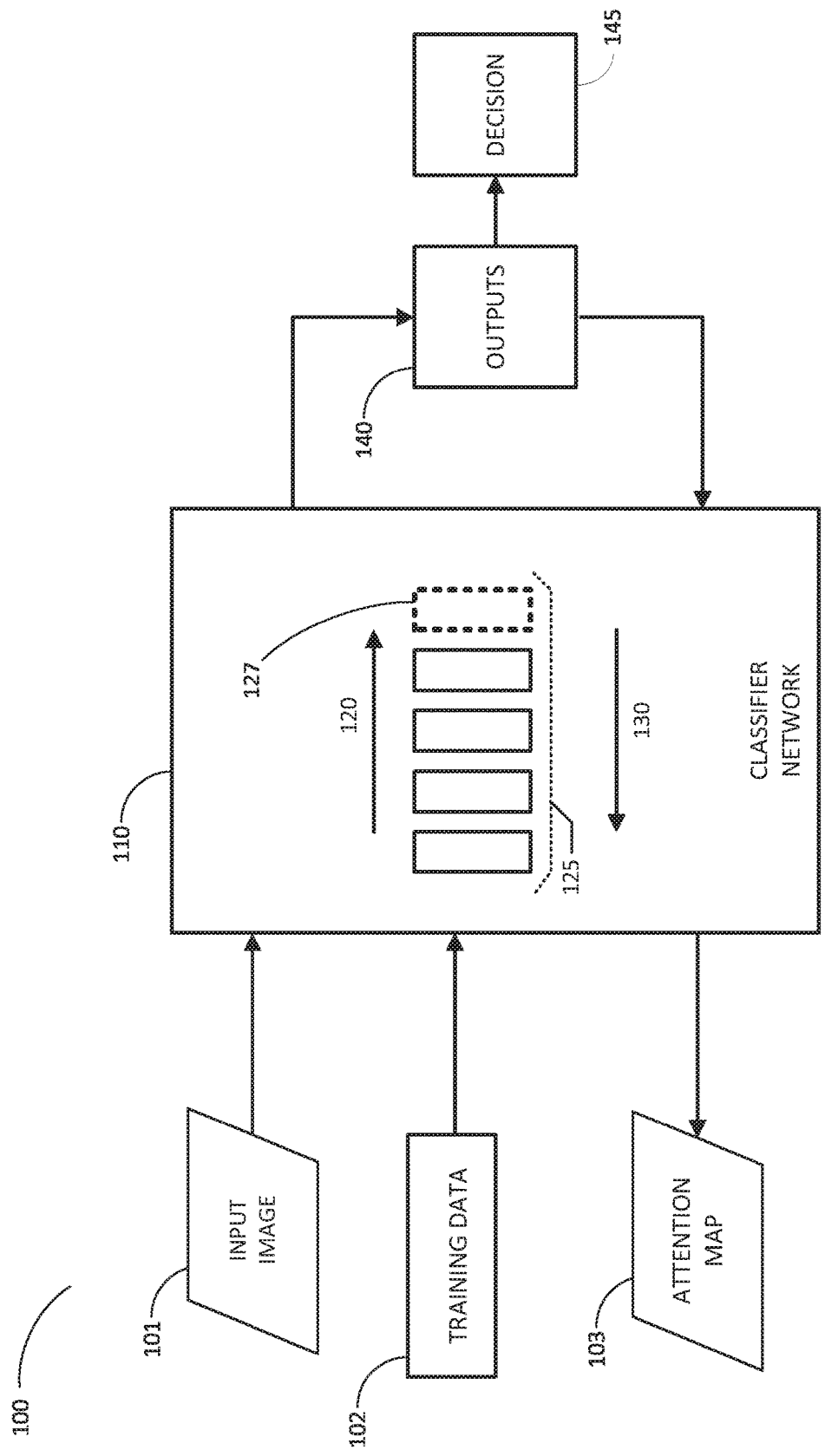
FIG. 1 shows a block diagram of an exemplary system for detection of an image class in accordance with one or more embodiments of the disclosure.

FIG. 1 is a block diagram depicting detection of image anomalies in accordance with one or more example embodiments of the disclosure. A classifier 110, such as a CNN for example, may have hidden layers 125, which may include or omit one or more of the following layer types: convolutional layers, max-pooling layers, fully connected layers and softmax layers. The convolutional layers may extract features from the image data, such as edges and lines. An optional inference module 127 may produce a feature map, which may map one or more features to a class. The feature map may be stored as a lookup table.

During a training period, the classifier 110 may be trained to classify images, i.e., learn to identify objects in a series of input images, based on a comparison of input images to training data 102, which may be images or patches. The training data 102 may include a label or annotation which identifies the classification to be learned by the classifier 110. The classifier 110 may further be trained to classify whether an image includes anomalous regions. The training data 102 used by the classifier 110 may be defined by patches computed from input images and corresponding ground truth labels indicating whether a patch contains anomalous regions or not. Patch-based training can help the classifier 110 to learn fine-grained characteristics of anomalous regions by focusing on a smaller area. Patch-based training may also avoid overfitting in cases where the training data is too small to train a model.

By way of example, training data 102 may include a set of images that are known to have image anomalies, and annotated as such. A binary label may be defined for the entire training image based on the presence of any anomalous parts in an image, which can be easily obtained in real-time without extensive labeling effort. The anomalous regions in the training images need not be defined, segmented or outlined. An adequate training image may be defined as having at least one anomalous pixel. Each training image may be labeled or annotated as and stored prior to training of the classifier 110. For example, a training image having an anomalous regions may be annotated as "positive" and a training image having no anomalous region may be annotated as "negative". Because the training data 102 is image-level based (i.e., the annotation applies to the entire image) rather than pixel-level based, the deep learning of the classifier 110 according to the embodiments of the disclosure is considered to be weakly supervised. By the application of image-level based annotation, the training process is greatly streamlined and can be completed with reduced effort.

The classifier 110 may be trained without the benefit of previous data or information (i.e., from scratch) or may be fine-tuned depending on the size of the training set in the application domain.

Training of the classifier 110 may apply a cost function that measures how successful the expected output is compared to the given training sample, where each hidden layer 125 is a weighted and biased function f performing an operation on one or more inputs. Adjustments to the weights and bias values may be made until expected output values are acceptable for a series of forward passes.

The classifier 110 may be trained in two phases. During an initialization training phase, a very large set of images with a variety of subjects may be fed to the classifier as training data 102. For example, images from the ImageNet collection may serve to initialize the parameters of the classifier 110. As a refinement phase of training, specialized images of expected abnormalities may be fed to the classifier as training data 102. For example, where misplaced objects pose a potential safety hazard for a particular setting are a common anomaly at a monitored station (e.g., a tool left behind by a worker near moving machinery after a repair event), various images of foreign objects may serve as the training data 102 during the refinement phase. As another example aside from anomaly detection, the training data 102 may be selected to train the classifier to distinguish between memorable and forgettable images.

During normal operation after the classifier 110 has been fully trained, the classifier 110 may process an input image 101 during a forward pass 120, generating a 1D vector of prediction outputs 140. For example, in a case where the classification is positive P for presence of an image anomaly or negative N for absence of an anomaly, there may be two outputs with likelihood values between 0 and 1, such as P=0.9 and N=0.1 Here, since P>N, the decision 145 would be defined to indicate "positive", i.e., that the input image contains an anomaly. In this example having two outputs 140, the decision 145 is binary. In this example, the 1D prediction vector contains two entries for the two classes. However, the present disclosure may implement more than two classes, such as n classes where n>2, in which case the 1D prediction vector contains n values.

In response to a classification decision 145, the classifier 110 may perform a backward pass 130 of each convolution layer 125 in reverse order of the forward pass 120. As an example, a gradient function may be applied to a result value obtained during the forward pass function f for a given layer 125. In an embodiment, the following back propagation operation may be performed on each layer 125 individually:

$$\nabla f = \frac{\delta f}{\delta x} \qquad \text{Equation 1}$$

where $\nabla f$ is a gradient of the function f on input x, and determined by a partial derivative.

Following the final operation of backward propagation 130 through the hidden layers 125 for each pixel of the image, a gradient value is determined for each pixel and converted to an attention map 103. For each pixel in the attention map 103, a grayscale value may be assigned proportional to the gradient value. The attention map 103 may be defined by a reciprocal mapping between the forward propagation and the backward propagation of the classifier 110. The attention map 103 includes attention maps generated via back-propagation with both positive and negative signals. To generate the positive attention map and the negative attention map, a positive signal or negative signal for the back propagation may be generated by setting positive and nodes in a fully connected layer in the classifier 110. For example, the positive signal for the back propagation may be generated by setting the positive node to value 1 and the negative node to value 0. The negative signal for the back propagation may be generated by setting the positive node to value 0 and the negative node to value 1. The attention map 103 may be generated by two back propagation passes, one with the positive signal and the second with the negative signal. A positive attention map, corresponding to the positive signal, encodes the location of the anomalous pixels. A negative attention map, corresponding to the negative signal, encodes the location of the normal pixels. Both the positive and negative attention maps may include pixels that are neither encoded anomalous nor normal, and are considered to be uncertain. The negative attention map can be used to improve the confidence of the positive attention map by reducing the area of uncertain pixels. Attention map pixels are encoded using a scoring based on magnitude threshold scale. The negative attention map may reconfirm the location of anomalous pixels by determining that for each pixel, there is not a high score on both positive and negative attention maps.

Figure 2:
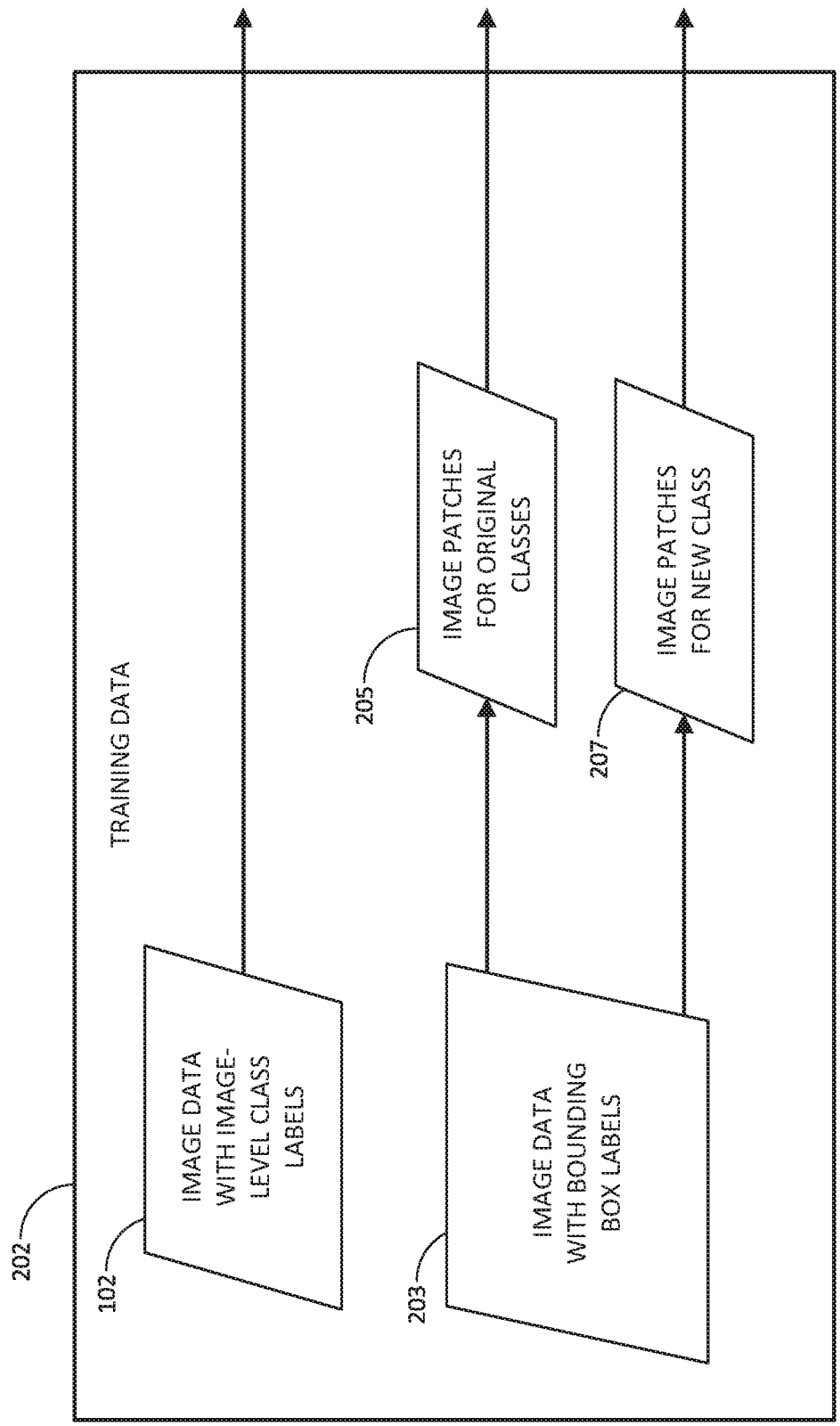
FIG. 2 shows an example of training data inputs for the system as shown in FIG. 1.

FIG. 2 shows an example of enhanced training data for the system shown in FIG. 1. In an embodiment, training data 202 may include data with image-level labels, such as training data 102 described above, in combination with a smaller sample set of image data 203 using bounding box labels. This additional refinement of training data may provide a more robust and reliable data set for improvement to the weakly supervised classifier system of FIG. 1. The image data 203 may be used to create a new class to guide the classifier during training time. This new class may include image patches that exclude key areas of focus for the classifier 110. Such a feature is useful as an added measure to reduce the likelihood of the classifier 110 detecting unimportant areas from the background in an image during image-level supervision, particularly when there is a presence of noise and background variations in the scene.

An image-level classification may consist of n classes. For example, in a basic case where n=2, the choice of training classes is between two types of images, one belonging to a first class and another belonging to a second class. Examples may include tangible classes, such as images with a human face and images without a human face. Within the conceptual category, examples include defining a normal class and an abnormal class, where the abnormal class includes an anomalous region. Another example of conceptual class includes a memorable class and a forgettable class, where the memorable class may be defined as images having visually appealing regions or having notable details.

In an embodiment, the training data 202 may consist of two classes based on rotation orientation of an object in the foreground of an image, where a first class may represent images of an object rotated by some degree from images of the same object in a second class representing a reference baseline orientation. The training data with image-level labels 102 may consist of a substantial number of samples, such as around 400 samples, for each class with image-level labels. Images selected for the training data 203 with bounding box labels may consist of a smaller number of samples, such as around 20 images for each class, with bounding boxes enclosing key markers in the image that are helpful for detecting the rotation. Image patches 205 may be cropped from the sample images of each class, and may be labeled to include the markers with the same image-level class label corresponding to the image from which the patches are cropped. Image patches 207 may be cropped from areas that are not within the bounding boxes, and labeled as a new class named "ambiguous." The image patches 205 and 207 may be resized to match the size of the original image. Once all sets of training data images 205 and 207 have been generated and resized, the classifier 110 may be trained by applying training data 102, 205, and 207. The training data 102, 205 and 207 may also be applied as a retraining following an initial training (or 'pretraining') of the classifier 110 by one of the available open source training data sets, (e.g., ImageNet).

Figure 3:
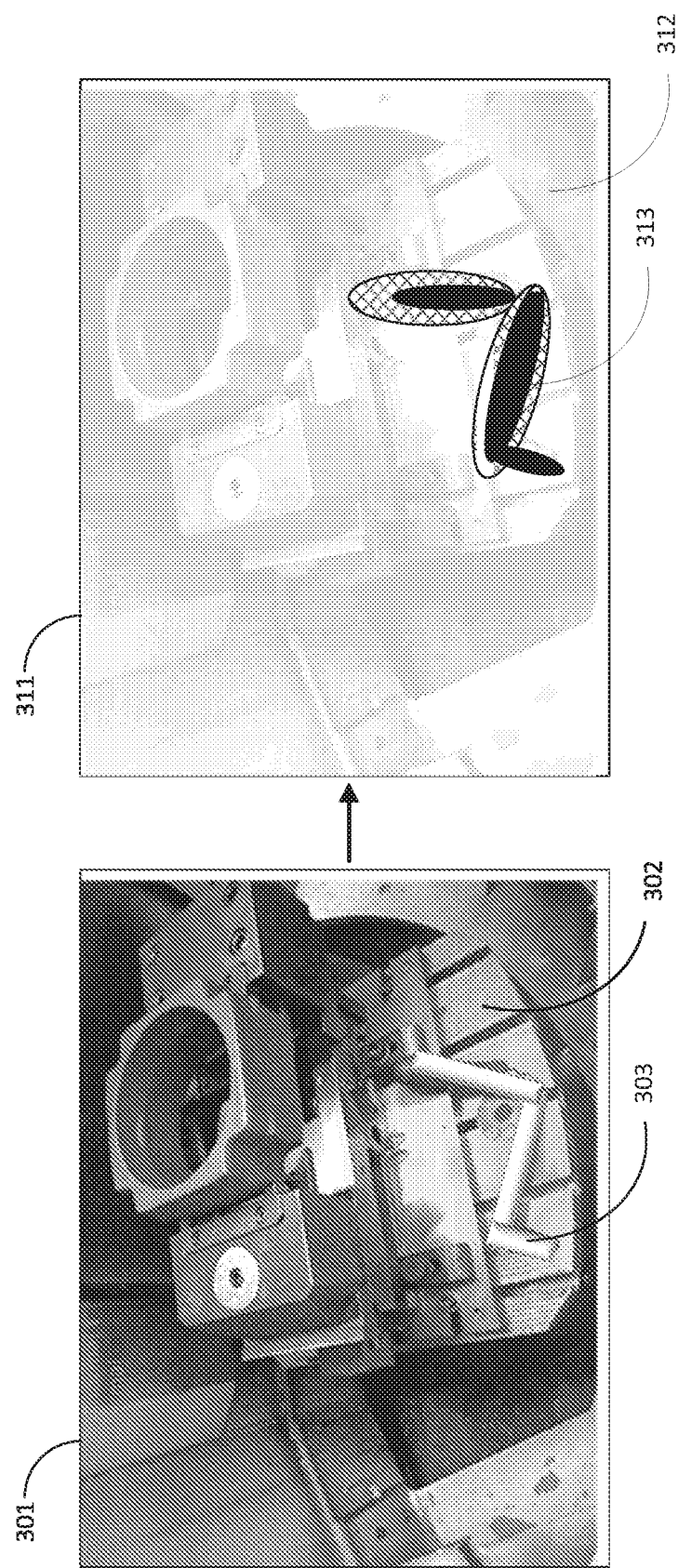
FIG. 3 is shows an attention map for an anomalous region of an image in accordance with one or more embodiments of the disclosure.

FIG. 3 shows an example of an attention map for an anomalous region of an image in accordance with one or more embodiments of the disclosure. In an embodiment, a trained classifier network 110 may generate an attention map for an abnormal class. Input image 301 may be one of several test images for visual localization of an anomaly by the classifier network 110. The input Image 301 includes a normal region 302 and an abnormal region 303. For this example, the normal region 302 includes a machine in the foreground, and the abnormal region 303 of the image is of a misplaced tool on a surface of the machine, which could present a hazard for interference with safe operation of the machine. Hence, the abnormal region 303 is to be localized by the classifier network 110. Attention map 311, which may be produced by the back propagation of the input image 301 through classifier 110 of FIG. 1, shows a high attention region 313 by a sharp grayscale contrast or intensity variation relative to the remainder of the image (e.g., relatively darker or brighter than other regions), as an indication of an anomalous region. Other variations are possible such as using color gradation to accentuate the attention region 313. While an example of a misplaced tool is shown and described for visual localization, other features of an image foreground may be selected for normal and abnormal classification, including but not limited to rotation orientation of a symmetric object.

Figure 4:
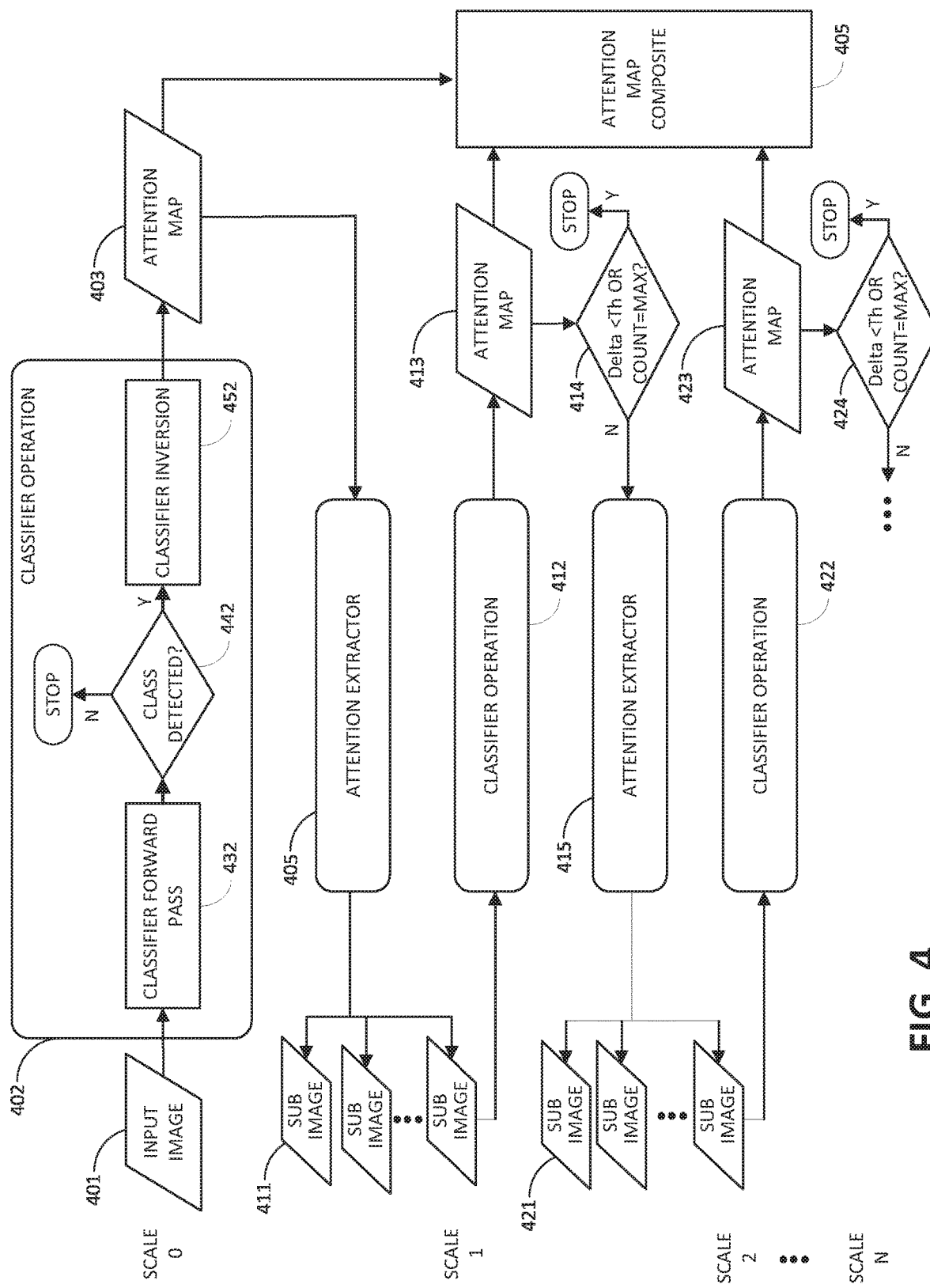
FIG. 4 shows a flow diagram of an example process for visual localization using a weakly supervised network in accordance with one or more embodiments of the disclosure.

FIG. 4 shows a flow diagram for an example of a visual localization process using a weakly supervised network in accordance with one or more embodiments of the disclosure. As shown, the process is a scale based iterative set of operations, for scale 0 to scale N. At scale 0, a test image, such as input image 401, may be fed to the classifier operation 402, which may include a classifier forward pass 432, a test 442 for a successful class detection, and a classifier inversion 452. The classifier inversion 452 may generate an attention map 403. An attention extractor 405 may crop one or more sub-images 411 from the attention map 403.

Figure 5:
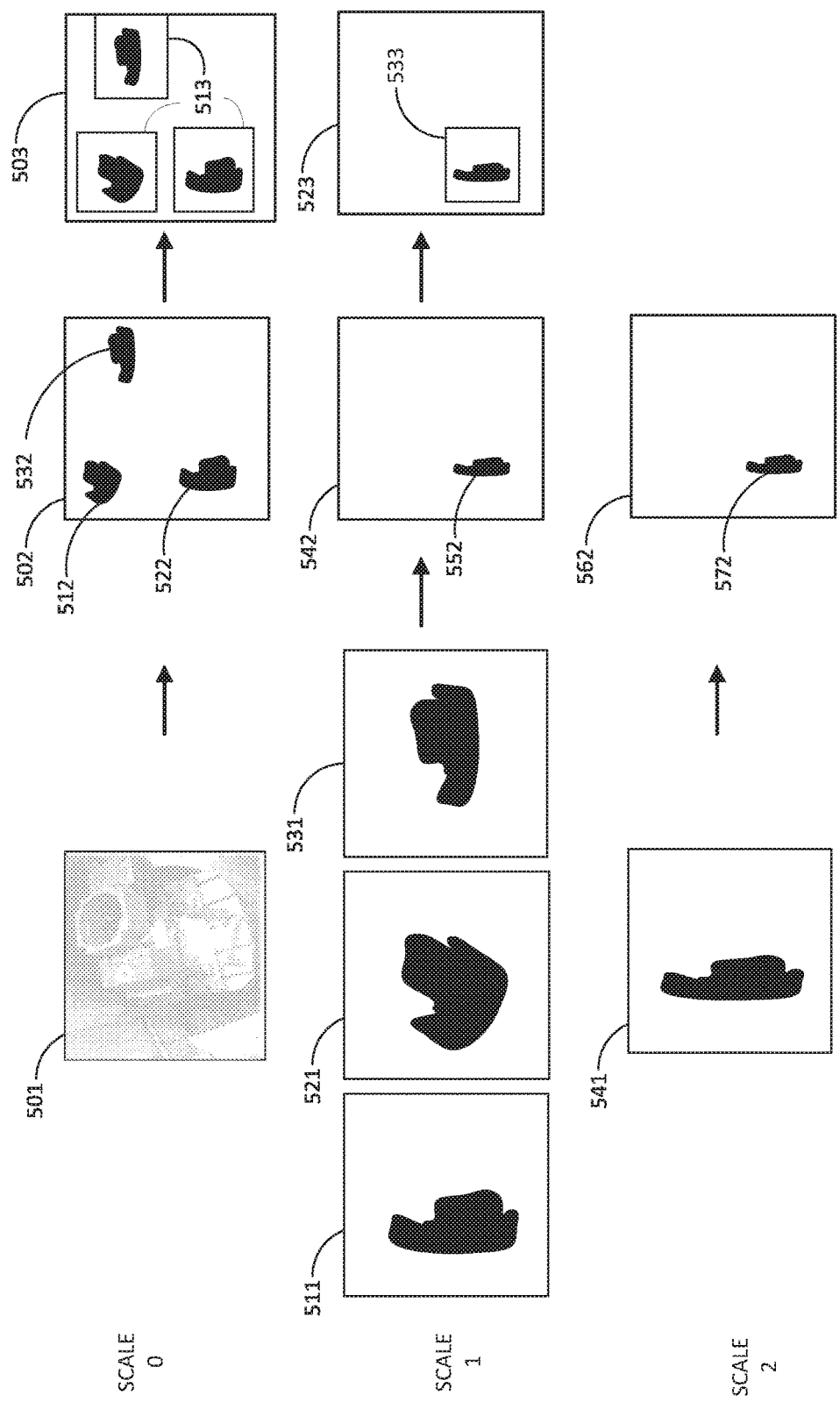
FIG. 5 shows examples of attention map images related to the visual localization process shown in FIG. 4.

FIG. 5 shows examples of attention map images related to the visual localization process shown in FIG. 4. At scale 0, an input image 501 may be processed by the classifier operation 402 to generate an attention map 502, which identifies regions 512, 522, 532 as potential localized areas for the classification indicated by attention values exceeding a threshold, such as pixels with high contrast and/or intensity magnitude. The attention extractor 405 may then perform an extraction operation 503 by boxing 513 and cropping the anomalous regions indicated by strongest attention. The boxing 513 operation may be based on a clustering algorithm with parameters set according to optimizing a clustered region to have a minimum number of pixels to provide a meaningful analysis, and may also have a maximum limit of boxed regions to cap the processing time and resources. The attention extractor 405 may crop each boxed region as an extraction image, and resize the extraction images at a variable scale according to a parameter set for the classifier operation (e.g., resized to N×M pixel size, where N and M are parameters of the classifier network). The resized extraction images effectively enlarge the attention regions 512, 522, 532 for refinement of the first attention map when processed by a subsequent iteration. The resized extraction images become sub-images 511, 521, 531 for inputs to the scale 1 iteration. Subsequent scale iterations 2 to N, if performed, may enlarge attention regions at each iteration for even further refinements to the attention map until an optimum attention map is reached.

Returning to FIG. 4, sub-images 411 may be fed to classifier operation 412 for the scale 1 iteration. The classifier operation 412 includes the same operations as described above for classifier operation 402, although not shown for simplicity in the illustration. An attention map 413 is the output of the classifier operation 412 on a condition that the sought class is successfully detected, in a manner similar to test 442 of scale 0 iteration. A limit test 414 may check whether the iterative attention mapping should continue or not. As an example, limit test 414 may determine if attention map 413 is significantly different than attention map 403 to warrant further refinement by additional iterations at incremented scales. For example, a comparison of grayscale for the entire attention map 403 and entire attention map 413 may indicate a delta for pixel-level grayscale intensity. Where the delta value is less than a threshold, the process may stop with a conclusion that the optimum attention map has been obtained. Should the delta not be less than the threshold, attention extractor 415 may start an extraction operation on the attention map 413. As another example, the limit test 414 may include a test to check whether a preset maximum count of iterations has occurred, which may be based on designer preference to limit expenditure of processing resources. As shown in FIG. 4, the scale 1 iteration may conclude by cropping and resizing attention regions to produce one or more sub-images 421 corresponding to the number of extracted attention regions. Further iterations for scale 2 to scale N may proceed in a manner likewise to that described above for the scale 1 iteration, on the condition that the limit tests do not prompt termination.

Returning to FIG. 5, the scale 1 iteration is shown for an example operation in which only one sub-image produces a detected class from the forward pass of the classifier 412. On a condition that sub-images 521 and 531 fail to produce a detected classification, for the reason that attention regions 512 and 532 were false positives perhaps due to background noise, only sub-image 511 is processed by an inversion of the classifier to generate an attention map 542 with a refined attention region 552. When constructing the attention map 542, the attention region is rescaled from scale 1 to scale 0 and placed at a location in map 542 corresponding to the location it was in original attention map 502 so that a one-to-one comparison of consecutive attention maps can be performed. A comparison of attention map 542 with the previous attention map 502 indicates a significant grayscale delta, as regions 512 and 532 have been eliminated. The new attention map 542 also may produce a refined attention region 552 compared to the previous attention map region 522, as a result of the classifier operation on the enlarged image 511. For example, the attention region 552 may include less pixels, where the additional pixels of previous attention region 522 have been eliminated and can be attributed to background noise present in the scale 0 iteration. This attention region 552 may be cropped by the extraction tool at 513, and resized as sub-image 541. The scale 2 iteration may proceed using sub-image 541 as the input image to the forward pass of the classifier network. Following detection of the class, and inversion of the classifier network, attention map 562 is produced having an attention region 572, very similar to attention region 552 of the previous attention map 542. On a condition that the grayscale delta between the attention maps 542 and 562 is below the threshold, the iterative process may be terminated. A composite attention map may be produced by averaging the attention maps 502, 542 and 562, to produce the visual localization of the sought class in test image 501. Alternatively, the attention map 562 may be used for the optimal visual localization of the sought class for the test image 501.

The advantage of the iterations having incremented scales 0 to N is that resized sub-images may be analyzed by the classifier inversion at a finer resolution than the previous scale, such that the resulting attention map may reveal one or more of the prior attention regions to be erroneous, as in the case of regions 512 and 532 of attention map 502, which were eliminated in the scale 1 iteration.

Figure 6:
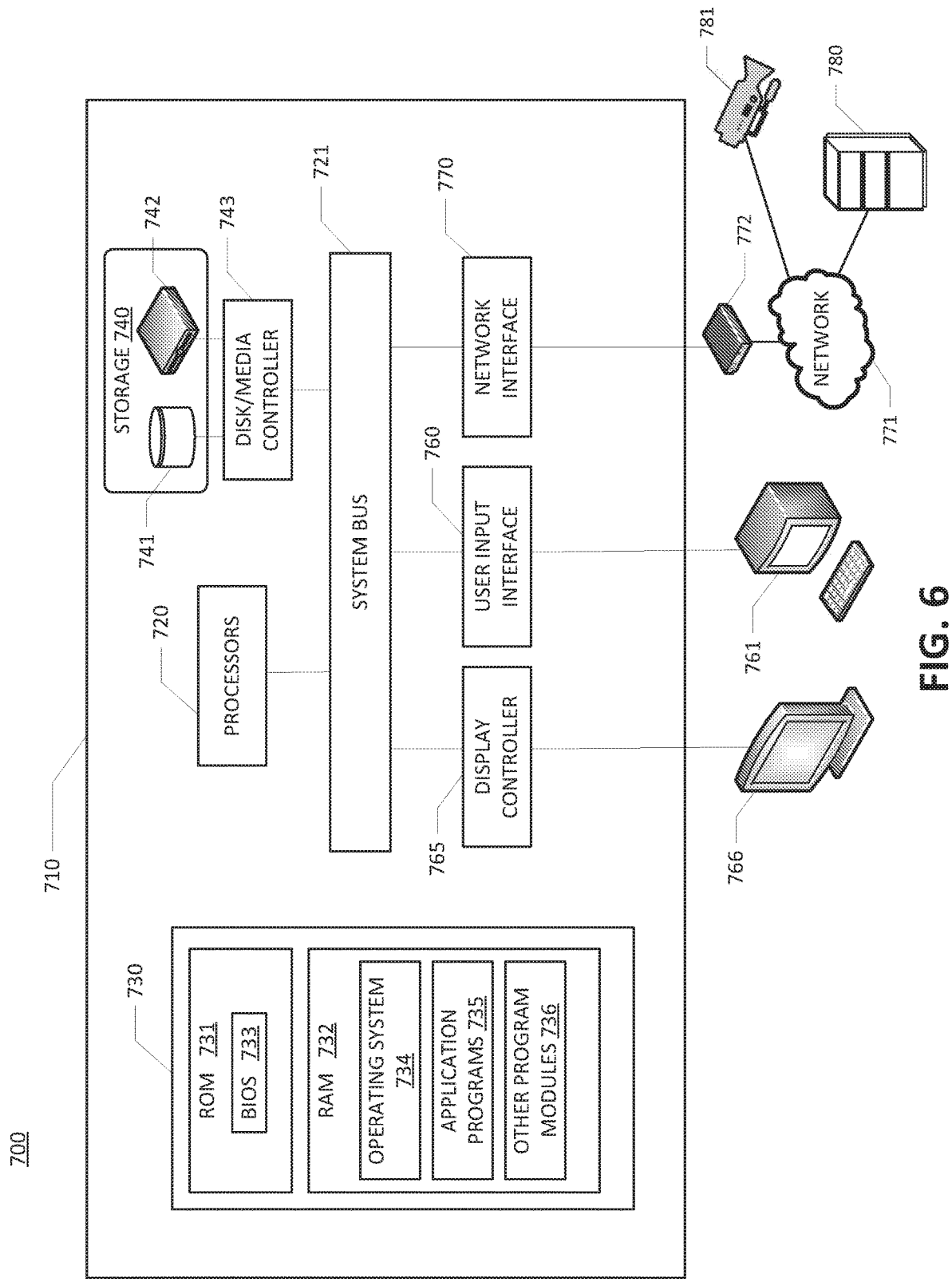
FIG. 6 illustrates an exemplary computing environment within which embodiments of the disclosure may be implemented.

FIG. 6 illustrates an exemplary computing environment 700 within which embodiments of the disclosure may be implemented. Computers and computing environments, such as computer system 710 and computing environment 700, are known to those of skill in the art and thus are described briefly here.

As shown in FIG. 6, the computer system 710 may include a communication mechanism such as a system bus 721 or other communication mechanism for communicating information within the computer system 710. The computer system 710 further includes one or more processors 720 coupled with the system bus 721 for processing the information.

The processors 720 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 720 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 721 may include at least one of a system bus, a memory bus, an address bus, or a message bus, and may permit exchange of information (e.g., data (including computer-executable code), signaling, etc.) between various components of the computer system 710. The system bus 721 may include, without limitation, a memory bus or a memory controller, a peripheral bus, an accelerated graphics port, and so forth. The system bus 721 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 6, the computer system 710 may also include a system memory 730 coupled to the system bus 721 for storing information and instructions to be executed by processors 720. The system memory 730 may include computer readable storage media in the form of volatile and/or nonvolatile memory, such as read only memory (ROM) 731 and/or random access memory (RAM) 732. The RAM 732 may include other dynamic storage device(s) (e.g., dynamic RAM, static RAM, and synchronous DRAM). The ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system 733 (BIOS) containing the basic routines that help to transfer information between elements within computer system 710, such as during start-up, may be stored in the ROM 731. RAM 732 may contain data and/or program modules that are immediately accessible to and/or presently being operated on by the processors 720. System memory 730 may additionally include, for example, operating system 734, application programs 735, and other program modules 736.

The operating system 734 may be loaded into the memory 730 and may provide an interface between other application software executing on the computer system 710 and hardware resources of the computer system 710. More specifically, the operating system 734 may include a set of computer-executable instructions for managing hardware resources of the computer system 710 and for providing common services to other application programs (e.g., managing memory allocation among various application programs). In certain example embodiments, the operating system 734 may control execution of one or more of the program modules depicted as being stored in the data storage 740. The operating system 734 may include any operating system now known or which may be developed in the future including, but not limited to, any server operating system, any mainframe operating system, or any other proprietary or non-proprietary operating system.

The application programs 735 may a set of computer-executable instructions for performing the visual localization process in accordance with embodiments of the disclosure.

The computer system 710 may also include a disk/media controller 743 coupled to the system bus 721 to control one or more storage devices for storing information and instructions, such as a magnetic hard disk 741 and/or a removable media drive 742 (e.g., floppy disk drive, compact disc drive, tape drive, flash drive, and/or solid state drive). Storage devices 740 may be added to the computer system 710 using an appropriate device interface (e.g., a small computer system interface (SCSI), integrated device electronics (IDE), Universal Serial Bus (USB), or FireWire). Storage devices 741, 742 may be external to the computer system 710, and may be used to store image processing data in accordance with the embodiments of the disclosure, such as input image data 101, training data 102, attention maps 103, outputs 140 and decision data 145 described with respect to FIG. 1, training data 202 as shown and described with respect to FIG. 2, attention maps 403, 413, 423, input images 401, sub-images 411, 421, and attention map composite 405 as shown in FIG. 4.

The computer system 710 may also include a display controller 765 coupled to the system bus 721 to control a display or monitor 766, such as a cathode ray tube (CRT) or liquid crystal display (LCD), for displaying information to a computer user. The computer system includes a user input interface 760 and one or more input devices, such as a user terminal 761, which may include a keyboard, touchscreen, tablet and/or a pointing device, for interacting with a computer user and providing information to the processors 720. The display 766 may provide a touch screen interface which allows input to supplement or replace the communication of direction information and command selections by the user terminal device 761.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as the magnetic hard disk 741 or the removable media drive 742. The magnetic hard disk 741 may contain one or more data stores and data files used by embodiments of the present invention. The data store may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, layers 125 of the classifier network 110 as shown in FIG. 1. Data store contents and data files may be encrypted to improve security. The processors 720 may also be employed in a multi-processing arrangement to execute the one or more sequences of instructions contained in system memory 730. In alternative embodiments, hard-wired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processors 720 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 741 or removable media drive 742. Non-limiting examples of volatile media include dynamic memory, such as system memory 730. Non-limiting examples of transmission media include coaxial cables, copper wire, and fiber optics, including the wires that make up the system bus 721. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 700 may further include the computer system 710 operating in a networked environment using logical connections to one or more remote computers, such as remote computing device 780, and one or more vision detection devices 781, such as a camera that can detect one of RGB, infrared, depth (e.g., stereo camera) or the like, that may be used to capture input images 101, 401, 501. The network interface 770 may enable communication, for example, with other remote devices 780 or systems and/or the storage devices 741, 742 via the network 771. Remote computing device 780 may be a personal computer (laptop or desktop), a mobile device, a server, a router, a network PC, a peer device or other common network node, and typically includes many or all of the elements described above relative to computer system 710. When used in a networking environment, computer system 710 may include modem 772 for establishing communications over a network 771, such as the Internet. Modem 772 may be connected to system bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computing device 780). The network 771 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

It should be appreciated that the program modules, applications, computer-executable instructions, code, or the like depicted in FIG. 6 as being stored in the system memory 730 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 710, the remote device 780, and/or hosted on other computing device(s) accessible via one or more of the network(s) 771, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A system for visual localization in a test image, comprising:
    at least one storage device storing computer-executable instructions; and
    at least one processor configured to access the at least one storage device and execute the instructions to:
    generate, in plurality of scaled iterations, attention maps for a test image using a trained classifier network, wherein the classifier network is weakly supervised using image-level classifications of at least one class, wherein on a condition that a forward pass of the test image in the classifier network detects a first class, a current attention map is generated using an inversion of the classifier network;
    extract, in each scaled iteration, one or more regions of the current attention map having attention values greater than a threshold;
    resize each of the one or more extracted regions as a sub-image, wherein size of the sub-image is an incremental enlargement of the extracted region;
    wherein each subsequent attention map of respective scaled iterations is based on an inversion of the classifier network for each sub-image on a condition that a forward pass of the sub-image in the classifier network detects the first class;
    wherein for each scaled iteration, extraction of one or more regions of a current attention map is performed on a condition that the current attention map is significantly different than the preceding attention map; and
    identify a visual localization of the first class for the test image based on one or more of the subsequent attention maps.

2. The system of claim 1, further comprising:
    averaging the attention maps to produce an attention map composite, wherein the attention map composite is used to identify the visual localization of the first class.

3. The system of claim 1, further comprising:
    terminating the scaled iterations on a condition that a difference in pixel-level magnitude between a current attention map and a previous attention map is less than a threshold.

4. The system of claim 1, further comprising:
    terminating the scaled iterations on a condition that a count of scaled iterations equals a maximum count.

5. The system of claim 1, wherein the first class is defined as an abnormal class, a second class is defined as a normal class, and the classifier network is configured to detect the abnormal class for test images that include an anomalous region.

6. The system of claim 1, wherein the first class is defined as a first conceptual class, a second class is defined as a second conceptual class, and the classifier network is configured to determine a visual localization of the test image on a condition of a successful detection of the first conceptual class.

7. The system of claim 1, wherein the incremental enlargement is a variable scale.

8. A method for visual localization in a test image, comprising:
    generating, in plurality of scaled iterations, attention maps for a test image using a trained classifier network, wherein the classifier network is weakly supervised using image-level classifications of at least one class, wherein on a condition that a forward pass of the test image in the classifier network detects the first class, a current attention map is generated using an inversion of the classifier network;
    extracting, in each scaled iteration, one or more regions of the current attention map having attention values greater than a threshold;
    resizing each of the one or more extracted regions as a sub-image, wherein size of the sub-image is an incremental enlargement of the extracted region;
    wherein each subsequent attention map of respective scaled iterations is based on an inversion of the classifier network for each sub-image on a condition that a forward pass of the sub-image in the classifier network detects the first class;
    wherein for each scaled iteration, extraction of one or more regions of a current attention map is performed on a condition that the current attention map is significantly different than the preceding attention map; and
    identifying a visual localization of the first class for the test image based on one or more of the subsequent attention maps.

9. The method of claim 8, further comprising:
    averaging the attention maps to produce an attention map composite, wherein the attention map composite is used to identify the visual localization of the first class.

10. The method of claim 8, further comprising:
    terminating the scaled iterations on a condition that a difference in pixel-level magnitude between a current attention map and a previous attention map is less than a threshold.

11. The method of claim 8, further comprising:
    terminating the scaled iterations on a condition that a count of scaled iterations equals a maximum count.

12. The method of claim 8,
    wherein the first class is defined as an abnormal class, a second class is defined as a normal class, and the classifier network is configured to detect the abnormal class for test images that include an anomalous region.

13. The method of claim 8, wherein the first class is defined as a first conceptual class, a second class is defined as a second conceptual class, and the classifier network is configured to determine a visual localization of the test image on a condition of a successful detection of the first conceptual class.

14. The method of claim 8, wherein the incremental enlargement is a variable scale.

\* \* \* \* \*